L. COATALEN.
JOINT FOR USE IN LINKWORK.
APPLICATION FILED DEC. 4, 1916.

1,251,965.

Patented Jan. 1, 1918.

Inventor:
Louis Coatalen,
by Spear, Middleton, Donaldson & Spear
Atty's.

UNITED STATES PATENT OFFICE.

LOUIS COATALEN, OF WOLVERHAMPTON, ENGLAND, ASSIGNOR OF ONE-HALF TO SUNBEAM MOTOR CAR COMPANY LIMITED, OF WOLVERHAMPTON, ENGLAND.

JOINT FOR USE IN LINKWORK.

1,251,965.     Specification of Letters Patent.     Patented Jan. 1, 1918.

Application filed December 4, 1916. Serial No. 135,049.

*To all whom it may concern:*

Be it known that I, LOUIS COATALEN, a subject of the King of Great Britain, and resident of Wolverhampton, Staffordshire, England, have invented certain new and useful Improvements in Joints for Use in Linkwork, of which the following is a specification.

This invention relates to joints for linkwork, of the kind in which two links are pivoted together, or indirectly to one joint pin. For instance, in V-type internal combustion engines it is common practice to connect two connecting rods to a single crank pin, and an arrangement commonly employed is to cause one connecting rod to take a bearing on the crank pin and the other is pivoted to a supplementary pin carried at the lower end of the first connecting rod. When this invention is applied to connecting rods of this kind it provides simple means of lubrication.

In the accompanying drawings.

Like letters indicate like parts in both drawings.

Figure 1:
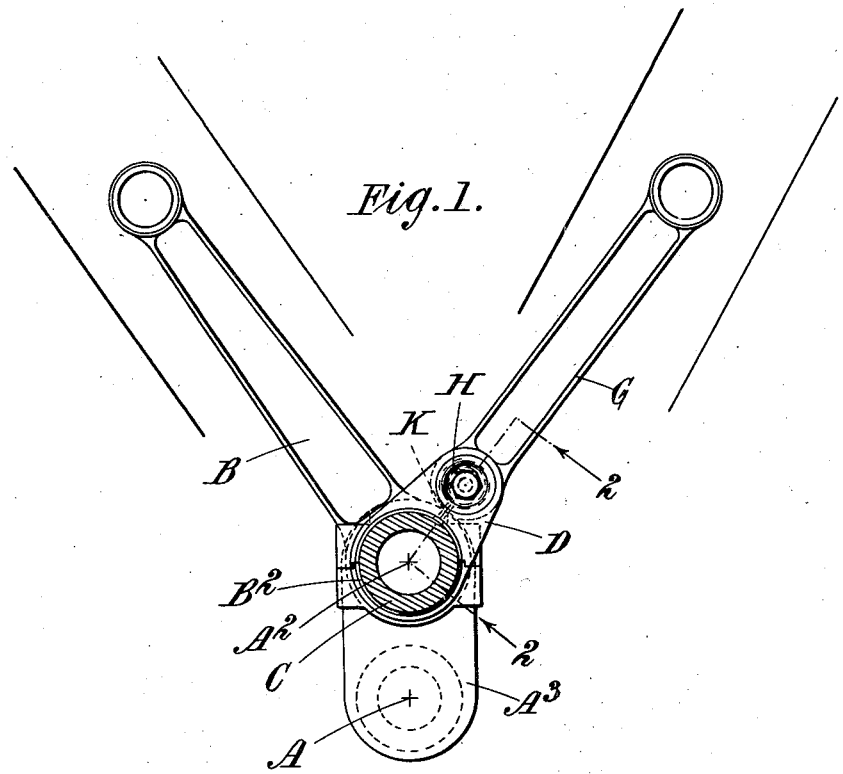
Figure 1 is a side elevation showing two connecting rods for a V-type internal combustion engine connected together in accordance with this invention.
Figure 2:
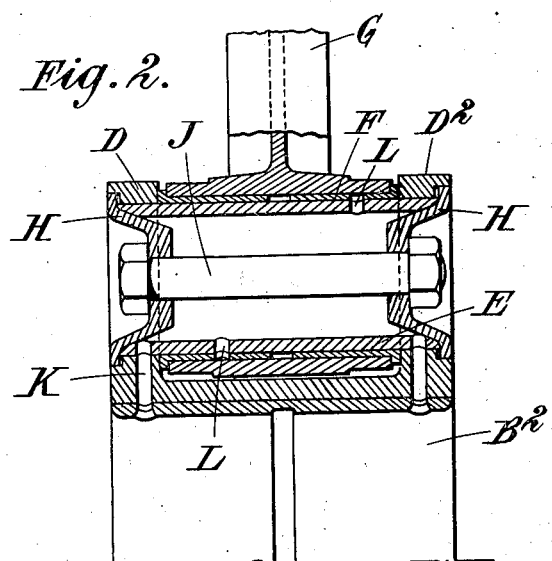
Fig. 2 is an enlarged section on the line 2—2 of Fig. 1, omitting the crank pin C.

In the drawings the axis of the crank shaft is shown at A and that of the crank pin at $A^2$, the crank webs being indicated at $A^3$. The master connecting rod B is provided with a bush $B^2$ which takes its bearing upon the tubular crank pin C. Formed integral with the end of the master rod are two lugs D $D^2$ having openings therethrough. In these openings is held a bearing pin E carrying a bush F upon which works the minor connecting rod G.

The bearing pin E is free to float in the openings of the lugs D $D^2$ and at each end is a washer H and these bear against the ends of the pin E but there is a slight clearance between the faces of the washers and the recessed faces of the lugs D $D^2$. The washers are drawn together by a bolt J but owing to the clearance the lugs are not drawn together and the crank pin is free to float slightly so that all binding is prevented.

Any suitable means may be provided to prevent rotation of the pin E in the openings of the lugs if this is necessary.

The bush F may be lubricated in a simple manner by oil received from the main crank pin bush $B^2$ which finds its way up passages K drilled through either or both of the openings in the lugs and through the pin E. Holes such as L in the bearing pin lead the oil to the bush F.

Thus the pin is held in place in a very simple manner, and the ends of the hollow pin are closed so that lubricant supplied to the interior cannot escape except through the proper outlets.

It will be seen that the chief service of the washers H is to retain lubricant in the hollow bearing pin E, but they also serve to hold the pin in position.

This invention may obviously be applied to joints other than those of engine connecting rods.

What I claim as my invention, and desire to secure by Letters Patent of the United States is:—

1. In linkwork, the combination of a crank pin, a master rod bearing thereon, lugs on said master rod having openings therethrough, a bearing pin free to float in said openings, and a rod upon said bearing pin substantially as set forth.

2. In linkwork, the combination of a crank pin, a master rod bearing thereon, lugs on said master rod, a bearing pin free to float in said lugs, a bolt through said bearing pin, a washer engaging each end of said bearing pin and acted upon by said bolt, and a rod upon said bearing pin substantially as set forth.

3. In linkwork, the combination of a crank pin, a master rod, a bush for said rod bearing upon said crank pin, lugs on said master rod, a hollow bearing pin free to float in said lugs, said bush having an oil passage to said hollow pin, a bolt through said pin, washers on said bolt engaging said pin, a rod bearing on said bearing pin, a bush to said pin, said bearing pin having oil passages, substantially as set forth.

In testimony whereof I have signed my name to this specification in the presence of two subscribing witnesses.

LOUIS COATALEN.

Witnesses:
  SAMUEL BAYLISS,
  T. CURETON.